United States Patent [19]
Weischedel et al.

[11] Patent Number: 5,687,187
[45] Date of Patent: Nov. 11, 1997

[54] PROCESS AND DEVICE FOR REGULATING THE POSITION OF THE TIP OF AN ELECTRIC FURNACE ELECTRODE

[75] Inventors: Walter Weischedel, Düsseldorf; Jürgen Kunze, Xanten, both of Germany

[73] Assignee: Mannesmann Aktiengesellschaft, Dusseldorf, Germany

[21] Appl. No.: 652,585

[22] PCT Filed: Dec. 6, 1994

[86] PCT No.: PCT/DE94/01497

§ 371 Date: Jul. 18, 1996

§ 102(e) Date: Jul. 18, 1996

[87] PCT Pub. No.: WO95/16336

PCT Pub. Date: Jun. 15, 1995

[30] Foreign Application Priority Data

Dec. 7, 1993 [DE] Germany ............... 43 42 498.8

[51] Int. Cl.$^6$ ................................................. H05B 7/156
[52] U.S. Cl. ........................... 373/105; 373/50; 373/104
[58] Field of Search ......................... 373/47, 49, 50, 373/102, 104, 105, 108

[56] References Cited

U.S. PATENT DOCUMENTS 4,580,272  4/1986  Honkaniemi et al. .............. 373/104
5,331,661  7/1994  Maguire et al. ..................... 373/105
5,568,506  10/1996  Schlienger ........................... 373/50

FOREIGN PATENT DOCUMENTS 2522801  12/1976  Germany.
138402  10/1979  Germany.
3600662  7/1987  Germany.

Primary Examiner—Tu B. Hoang
Attorney, Agent, or Firm—Cohen, Pontani, Lieberman & Pavane

[57] ABSTRACT

A process and a device for regulating the position of the tip of an electrode immersed in an electric furnace heated by electric arc or resistance heating. To precisely measure the position of the electrode tip and to position it in operation, a series of gas containers are introduced into the electrode in succession at certain intervals, with each gas container being given a serial number ($n_i$). The position of the electrode tip is determined by computer from the data of the last gas container with the serial number ($n_j$) and the current number of the melted-open gas container, determined by gas analysis, using the gas that rises in the furnace through the melting process. Control technology is then applied to the drive of the electrode bearing device.

11 Claims, 2 Drawing Sheets

PROCESS AND DEVICE FOR REGULATING THE POSITION OF THE TIP OF AN ELECTRIC FURNACE ELECTRODE

BACKGROUND OF THE INVENTION

1. Field of the Invention

The invention relates to a process for regulating the position of the tip of an electrode which is immersed in an electric furnace heated by electric arc or resistance heating. The electrode is fastened to a bearing device and preparations are introduced into the electrode. The length of the electrode is calculated by registering the distance between a specific point up until evaporation of the preparation.

2. Description of the Prior Art

In electric furnaces or other installations which use consumable electrodes, it is necessary to know the precise position of the individual electrodes. This is of particular importance for installations in which the electrode tips cannot be seen during furnace operation, for example in the case of closed furnaces or furnaces where the batch is covered. In the case of processes for the production of iron-containing alloys, self-baking electrodes are used, while in the production of silicon metal, pre-baked electrodes are used, these being necessary because of the required purity of the product.

Since the knowledge of the exact position of the electrode tip is of great importance for the smelter, recourse is nowadays often also made to processes in which the position of the tip is registered mechanically/optically. This, however, requires the smelting process to be interrupted and the tip to be driven out of the batch or out of the melt for the purpose of measurement or estimation. Furthermore, processes which can be carried out during furnace operation are known.

Thus, German Offenlegungsschrift 25 22 801 discloses a process for measuring the length or immersion depth of a hollow electrode which is immersed into the charged hearth of an electrothermal smelting furnace. In this process the lowering of a measuring rod is measured on a cord and, taking into account the state of baking of the electrode mount, the immersion depth of the electrode into the charge is determined.

To carry out the process, a so-called hollow electrode is necessary, as is complicated sealing of the hollow electrode from the furnace gas. Furthermore, so-called depth-sounding probes are attached to the cords, and are lowered onto the solid base of the furnace until the weight is completely relieved, with the known difficulties of precisely feeding the cord through the seal without influencing the measurement accuracy. The fact that the level and the material composition of the solid base of the bottom are undefinable and depend on the process has proven to be a further disadvantage of this process.

DE 36 00 662 A1 discloses a process for measuring the depth of lowering of an electrode of an electric arc furnace, in which measuring lines which can be consumed by the thermal energy of the melt bath are introduced into the electrodes, as far as the bottom end thereof. The intention is to register electrical or acoustic signals using the measuring lines.

The disadvantage of the process known from this reference is the thermal influence on the measuring line, which, in addition, also depends still more rapidly during the vertical movement of an electrode as a function of the bath, the batch located thereon, and the lining located in the furnace vessel.

When a Söderberg electrode is used, the influence of the electric conductivity of the baked electrode body between the lines cannot be controlled. This stems from the nonuniform properties of the baked electrode compound along the vertical axis because of the discontinuous filling of the electrode as the result of electrical or metallurgical causes.

Furthermore, GDR Patent 136 402 discloses a process for determining the free length of electrodes of the Söderberg type in electric furnaces, in which process the length of the advance of the electrode is measured from the passage of a radioactive preparation, fixed in the electrode, through a specific point up until evaporation of the radioactive preparation in the electric arc zone, and the free electrode length is calculated therefrom.

In the case of this process, radioactive preparations are used in a disadvantageous manner, which requires special measures for the protection of persons who stay in the vicinity of the oven.

A further disadvantage is the use of a cooled measuring probe which is inserted in the batch mixture approximately to the level of the bottom edge of the electrode. This measuring probe is inserted in a pipe, which impedes the furnace operation and can lead to incalculable damage if the coolant escapes into the furnace vessel and hence into the melt. Furthermore, the encapsulation which is necessary for the preparation is disadvantageous, as is the distinct separation of the measuring probe from the electric arc zone of about 1–1.5 m. In addition, specific difficulties occur in measuring the position, measured at a fixed level, of the evaporating preparation, since the position of the measuring instrument will only coincide with the electrode tip in exceptional cases.

SUMMARY OF THE INVENTION

The aim of the invention is to provide a process and a device with which, using simple means and avoiding the disadvantages of known methods, the measurement of the position of the electrode tip and the regulation of the free length of the electrode below the contact jaws, as well as of the position of the electrode tip in operation, can be carried out precisely and continuously.

Pursuant to this object, and others which will become apparent hereafter, one aspect of the present invention resides in a process for regulating the position of the tip of an electrode which is immersed in an electric furnace heated by either an electric arc or resistance heating. The electrode is fastened to a bearing device. The length of the electrode is calculated by registering a distance between a specific point up until evaporation of a preparation contained in the electrode. The process includes introducing gas containers into the electrode one after another in a row-like chain at a spacing (c), assigning each gas container a serial number ($n_i$), registering and transmitting a coordinate ($b_k$) of one of the gas containers in a region of a top edge of the electrode to a computer, and metrologically registering and communicating to a computer gas rising in the furnace vessel due to the gas containers melting open as a result of consumption of the electrode in a region of the tip of the electrode during operation of the electric furnace. Next, data is determined of a last gas container with a serial number ($n_j$) and a current melted-open gas container ($n_i$) by analyzing the gas. The present position of the electrode tip as a distance ($a_k$) from a fixed point which is at a distance L from the fixed point to the last gas container, is then determined from $a_k = L - (n_i - n_j) \times c + b_k$ and the position of the electrode bearing device is controlled based on this information wherein i, j and k are any arbitrary real number.

In another embodiment of the invention the instantaneous electrode tip position ($a_r$) is predicted from two successive measurements ($a_k$), ($a_{k-t}$) and a time interval ($\Delta t$) between the successive measurements ($a_k$), ($a_{k-t}$) and also from a time interval from the last measurement (t), a number of filling processes (z) undertaken and a magnitude of the filling ($\Delta 1$), based upon the equation $a_r = L - (n_i - n_j) \times c + [(a_k - a_{k-1}) \times t / \Delta t] + b_k - z \times \Delta 1$. According to the invention, gas is used as a measuring medium for regulating the position of the electrode tip. This gas is enclosed under pressure in containers which, during production, are introduced at a defined point of the electrode. During smelting operation, the electrode is consumed at its tip. The gas containers located at the tip are melted open and the gas flows, in the region of the electrode, into the furnace top. There, the gas is picked up by a gas sample being taken and is indicated via an analyzer and thus identified. With the aid of the analyzer, it is possible to determine the quality of the gas. With the knowledge of the exact time or the time intervals between two gas measurements and the knowledge of the defined position of the gas containers in the electrode, the current electrode length can be determined with great precision as a function of the set spacing between two gas containers.

As a supplement to the measurement of the electrode length, for one attachment point of the electrode mount to the electrode, the current position of the electrode bearing device and the current position of a selected container in the region of the top edge of the electrode are registered by a computer and are processed in addition to the results obtained from the gas data. In an advantageous development, the electrical data are registered metrologically by means of a measuring device and are transmitted to the computer. This computer is simultaneously connected to the control means of the vertical displacement of the electrode bearing device, so that there is, overall, a closed control loop. The individual gas containers have walls made, for example, from metal, which can have melting temperatures between 1400° and 2600° C. The containers themselves are filled at a pressure of up to 100 bar. The spacing of the individual gas containers is in the range of less than 1 m. The spacing of the containers determines the frequency of the measurements. It is suggested to select a spacing of a magnitude greater than 5 cm.

The spacing of the individual containers can be periodically uniform or else cyclic at different spacings. In the case of different spacings, it is possible with approximately uniform consumption of the electrode, to define the position of the tip precisely with the aid of the monitoring measurement of different spacings. Furthermore, it is proposed in another embodiment to fill different containers with different gases, to be specific either in relation to one electrode or else in relation to different electrodes in the case of a furnace operated with a plurality of electrodes, for example using three-phase power.

The sampling means—and also the length measuring device—is installed in a protected position at the open end of the furnace vessel. In the case of an exchange which is, for example, caused by maintenance, these devices are easy to change and to position precisely once more.

Of course, there is also the option of allowing the positions of the electrode tip to be indicated optically and, if appropriate, of controlling the installation manually.

BRIEF DESCRIPTION OF THE DRAWING

An example of the invention is set forth in the attached drawing, in which.

DETAILED DESCRIPTION OF THE PREFERRED EMBODIMENTS

Figure 1:
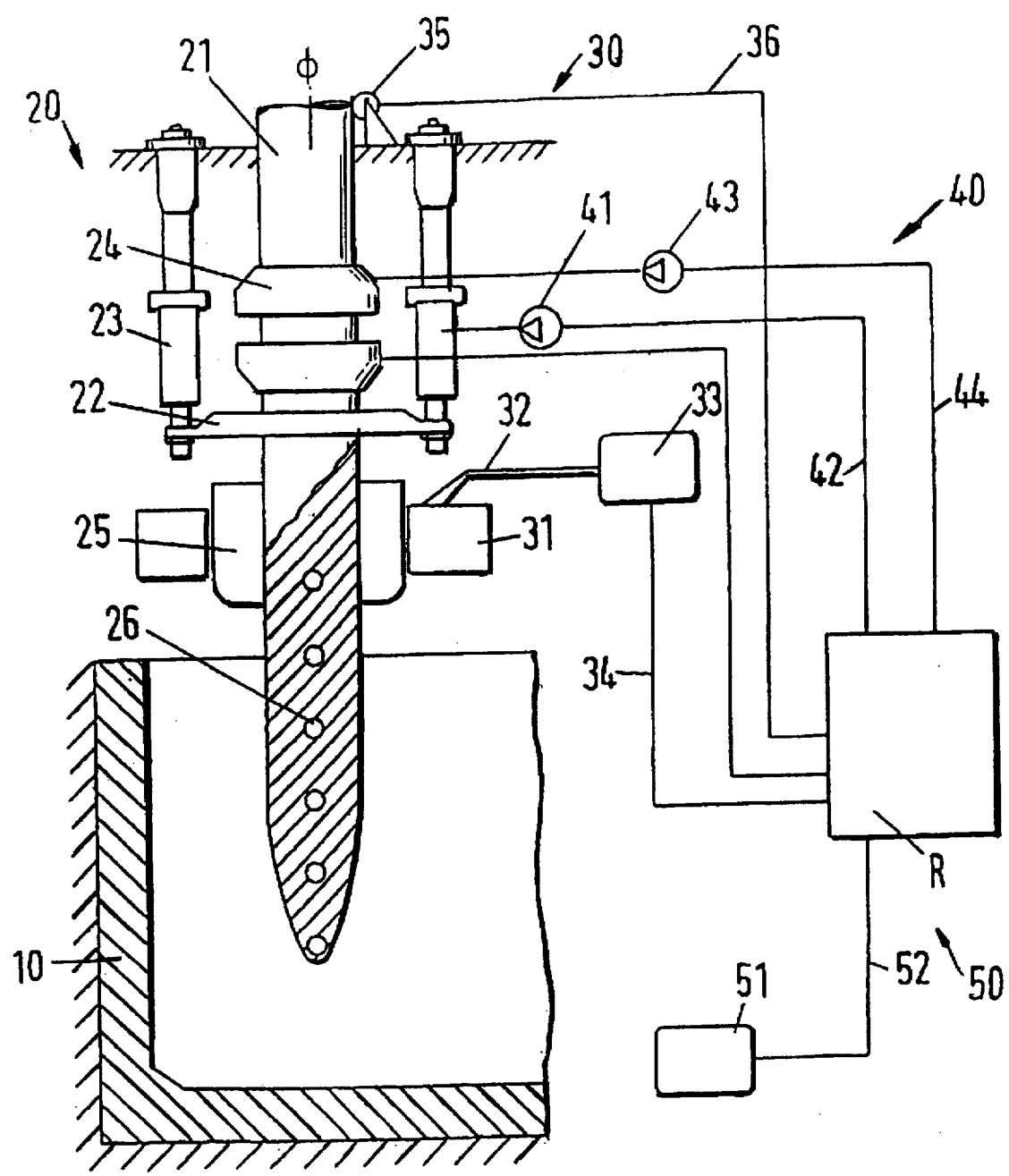
FIG. 1 shows a diagram of the electric arc furnace.

FIG. 1 shows a vessel 10 of an electric furnace, into which an electrode 21 projects. The electrode 21 is held by an electrode bearing device 20. The electrode bearing device 20 includes regulating cylinders 23 which are connected to one another via a crossbeam 22, on which a filling device 24 is arranged. The current feed to the electrode is carried out via contact jaws 25.

Gas containers 26, for example containing helium, are inserted into the self-baking electrodes 21 during furnace operation, or, in the case of pre-baked electrodes, are mounted in the correct position outside the furnace. These gas containers 26 are spaced apart from one another in a prescribable manner and are fed to the electrode 21 at its end which points away from the melt bath.

The measuring device 30 is connected to a computer R and has a gas sampling means 31, which is connected via a measuring line 32 to an analyzer 33.

In the region of the top edge of the electrode 21, a length measuring device 35 is provided for registering the coordinate of one of the last gas containers 26. Furthermore, the gas analyzer 33 is connected to the computer R via a gas measuring line 34, and the coordinate measuring device 35 is connected to the computer R via a length measuring line 36.

Furthermore, the computer R is connected to a control device 40, which has a drive 41 for the electrode bearing device and a drive 43 for the filling device. The electrode bearing device drive 41 is linked to the computer R via a control line 42 and the filling device drive 43 is linked to the computer R via a control line 44.

In addition, the computer R is further connected to a device 50 for registering the electrical data, which device includes a measuring instrument 51 and a measuring line 52 that connects the measuring instrument 51 to the computer R.

Figure 2:
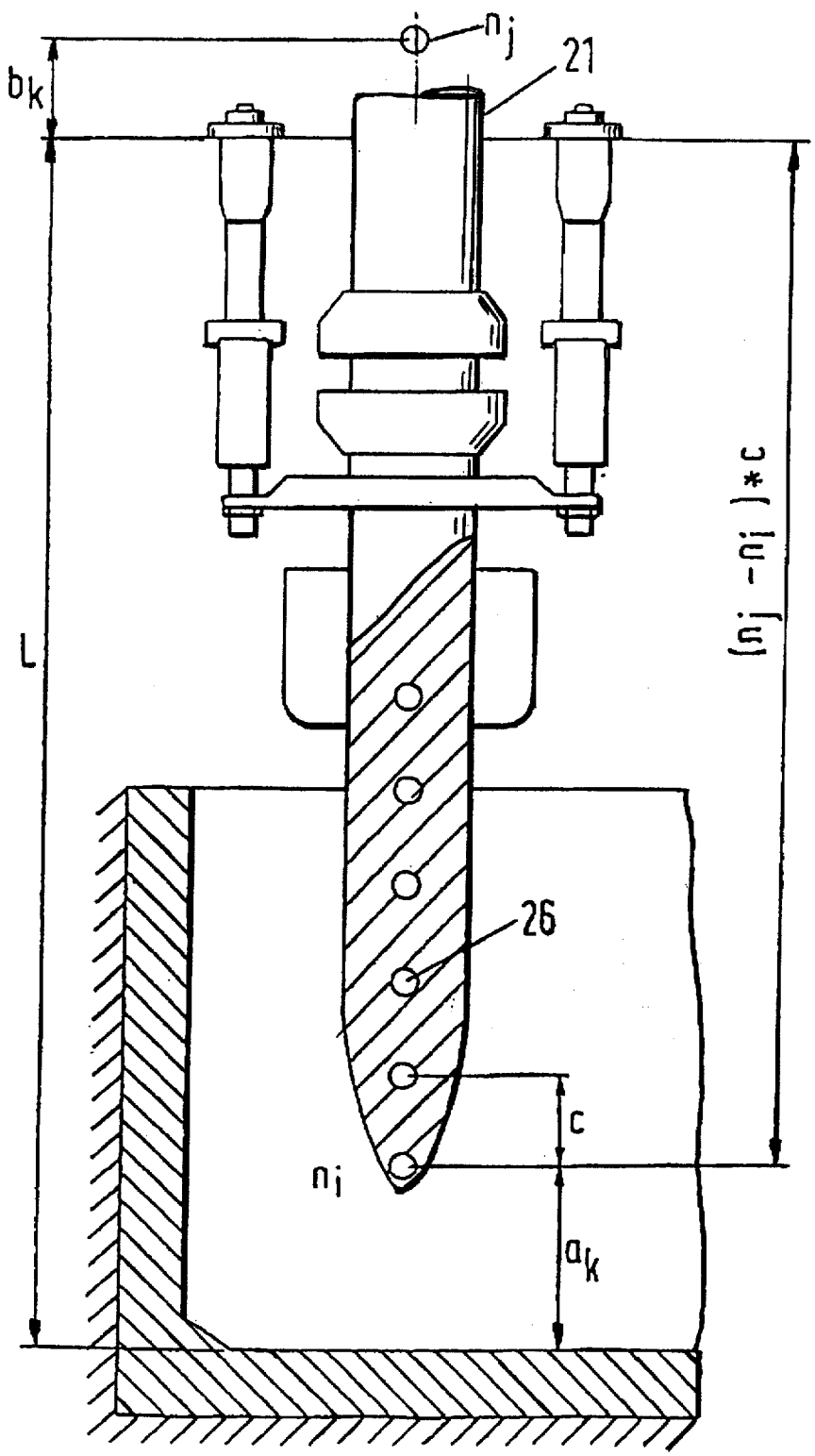
FIG. 2 shows the calculation method for determining the position of the electrode tip.

In FIG. 2, the spacings between two containers 26 are designated by c. The individual gas containers 26 are given a serial number, $n_i$ designating the current number of the melted-open gas container and $n_j$ designating the serial number of a gas container 26 in the region of the top edge of the electrode 21. The coordinate of this gas container 26 with the number $n_j$ is designated by $b_k$. In FIG. 2, this spacing of the last gas container from the furnace platform has been selected. Furthermore, the distance L, which is prescribed by the construction, has been selected here as the distance between the furnace platform and the outer jacket of the bottom of the furnace vessel, which distance is particularly suitable for the process. The distance of this fixed point from the position of the electrode tip has been designated by $a_k$. In one embodiment of the invention the gas containers 26 have a periodic spacing of $c = 1:2:3 \times \Delta c$, where $\Delta c$ is the smallest prescribed spacing.

We claim:

1. A process for regulating position of a tip of an electrode which is immersed in an electric furnace vessel, is fastened to a bearing device, and into which preparations are introduced, the length of the electrode being calculated by registering a distance between a specific point up until evaporation of the preparation, the process comprising the steps of: introducing gas containers into the electrode one after another in a row-like chain at a spacing (c); assigning each gas container a serial number ($n_i$); registering and transmitting to a computer a coordinate ($b_k$) of one of the gas containers in a region of a top edge of the electrode; metrologically registering and communicating to the computer gas rising in the furnace vessel due to the gas containers melting open as a result of consumption of the electrode in a region of the tip of the electrode during operation of the electric furnace; determining data of a last gas container with a serial number ($n_j$) and a current melted-open gas container by gas analysis; determining a present position of electrode tip as a distance ($a_k$) from a fixed point which i $\Delta$ at a distance (L) from the fixed point to the last gas container, in accordance with:

$a_k = L-(n_i-n_j) \times c + b_k$, wherein i,j, and k are any arbitrary real number; and controlling the position of the electrode bearing device.

2. A process as defined in claim 1, including predicting an instantaneous electrode tip position ($a_i$) from two successive determined electrode tip position measurements ($a_k$), ($a_{k-1}$), and a time interval between the successive determined electrode tip position measurements ($a_k$), ($a_{k-1}$), and also from a time interval ($\Delta t$) from a last time measurement (t), a number of filling processes (z) undertaken and a magnitude of the filling ($\Delta 1$) based on the equation $a_i = L-(n_i-n_j) \times c + [(a_k-a_{k-1}) \times t/\Delta t] + b_k - z \times \Delta 1$.

3. A process as defined in claim 1, wherein the step of introducing the gas containers into the electrode includes introducing the gas containers at a periodic spacing of $c = 1:2:3 \times \Delta c$, where $\Delta c$ is a smallest prescribed spacing.

4. A process as defined in claim 1, wherein the step of introducing gas containers into the electrode includes alternately introducing gas containers containing different gas.

5. A device for regulating a position of a tip of an electrode in an electric furnace vessel, comprising: electrode bearing means for immersing at least one electrode into the furnace vessel, the electrode bearing means including a drive; measuring means for registering lengths and movements of at least one of the electrode bearing means and the electrode; control means for vertically displacing the electrode gripped by the electrode bearing means; gas containers arranged at defined spacings from one another within the electrode; means for taking gas samples, said gas sampling means being arranged above the furnace vessel in a region of the electrode; computing means operatively connected to the gas sampling device and responsive thereto for controlling the drive of the electrode bearing means.

6. A device as defined in claim 5, wherein the containers have walls with a melting temperature above 1400° C.

7. A device as defined in claim 6, wherein the gas containers contain gas under a pressure greater than 1 bar.

8. A device as defined in claim 7, wherein the gas containers contain helium.

9. A device as defined in claim 5, wherein the gas containers are arranged in the electrode with a minimum spacing of c=5 cm.

10. A device as defined in claim 5, wherein the electrode bearing means includes a clamping device for clamping the electrode, the control means including drive means for driving the clamping device to clamp and release the electrode, and further comprising a control line arranged to connect the computer means to the drive means of the clamping device, the computer means being operative to control the drive means of the clamping device.

11. A device as defined in claim 5, wherein the electrode bearing means includes regulating cylinders and a clamping device for clamping the electrode, the control means including a drive for the regulating cylinders and a drive for the clamping device, and further comprising a measuring line arranged to connect the measuring means to the computer means, the computer means being operative to control the drive of the regulating cylinders and the drive of the clamping device.

* * * * *